(12) United States Patent
Pionetti et al.

(10) Patent No.: US 10,768,023 B2
(45) Date of Patent: Sep. 8, 2020

(54) METHOD AND DEVICE FOR MONITORING THE MECHANICAL BEHAVIOUR OF A SUBSEA PIPE FOR TRANSPORTING PRESSURIZED FLUIDS

(71) Applicants: SAIPEM S.A., Montigny le Bretonneux (FR); CEMENTYS, Paris (FR)

(72) Inventors: Francois-Regis Pionetti, La Baleine (FR); Jalil Agoumi, Le Kremlin-bicetre (FR); Axel Sundermann, Fontenay-les-briis (FR); Jean-Baptiste Paris, Paris (FR); Vincent Lamour, Paris (FR)

(73) Assignee: Saipem S.A., Montigny le Bretonneux (FR)

( * ) Notice: Subject to any disclaimer, the term of this patent is extended or adjusted under 35 U.S.C. 154(b) by 72 days.

(21) Appl. No.: 16/074,998

(22) PCT Filed: Jan. 20, 2017

(86) PCT No.: PCT/FR2017/050122
§ 371 (c)(1),
(2) Date: Aug. 2, 2018

(87) PCT Pub. No.: WO2017/134361
PCT Pub. Date: Aug. 10, 2017

(65) Prior Publication Data
US 2019/0041242 A1 Feb. 7, 2019

(30) Foreign Application Priority Data

Feb. 2, 2016 (FR) ...................................... 16 50829

(51) Int. Cl.
*G01D 5/353* (2006.01)
*G01M 11/08* (2006.01)
(Continued)

(52) U.S. Cl.
CPC .......... *G01D 5/35364* (2013.01); *G01L 1/242* (2013.01); *G01M 5/0025* (2013.01); *G01M 5/0041* (2013.01); *G01M 11/085* (2013.01)

(58) Field of Classification Search
CPC ............... G01D 5/353; G01D 5/35338; G01D 5/35354; G01D 5/35358; G01D 5/35361;
(Continued)

(56) References Cited

U.S. PATENT DOCUMENTS

| | | | |
|---|---|---|---|
| 7,315,666 B2 * | 1/2008 | Van Der Spek | ........ E21B 47/01 385/12 |
| 2003/0174924 A1 | 9/2003 | Tennyson | |

(Continued)

FOREIGN PATENT DOCUMENTS

WO    WO 2014/184144    11/2014

*Primary Examiner* — Gordon J Stock, Jr.
(74) *Attorney, Agent, or Firm* — Cozen O'Connor

(57) ABSTRACT

A method of monitoring mechanical behavior of an undersea pipe (2) transporting fluid under pressure and made by assembling a plurality of unit pipe elements (4). A calibration step is performed consisting of using a measurement cable having an optical fiber sensor to measure deformations experienced by each pipe element while it is subjected on land to various mechanical stresses in predetermined directions and magnitudes, and, on the basis of the measurements, establishing the mechanical signature of each pipe element. A monitoring step is performed consisting of using a measurement cable (18) having an optical fiber sensor that makes uses Brillouin backscattering and is helically positioned at constant pitch (p) on each pipe element with the handedness of the helical pitch alternating for two adjacent pipe elements to recover variations in optical signal injected into the sensors while the pipe is in service.

14 Claims, 2 Drawing Sheets

(51) Int. Cl.
  *G01M 5/00* (2006.01)
  *G01L 1/24* (2006.01)

(58) Field of Classification Search
  CPC ............. G01D 5/35364; G01D 5/3537; G01D
        5/35374; G01D 5/268; G01L 1/24; G01L
        1/241; G01L 1/242; G01L 1/255; G01V
        8/24; G01M 3/24; G01M 3/243; G01M
        3/38; G01M 5/0025; G01M 5/0066;
        G01M 5/0091; G01M 7/00; G01M 7/02;
        G01M 7/025; G01M 11/08; G01M
        11/083; G01M 11/085; G01M 11/086;
        G01M 11/088; G01M 11/30; G01M
        11/31; G01M 11/3109; G01M 11/3136;
        G01M 11/3145; G01M 11/3172
  USPC .............................. 356/32, 73.1; 385/12, 13
  See application file for complete search history.

(56) References Cited

U.S. PATENT DOCUMENTS

| | | | |
|---|---|---|---|
| 2007/0201793 A1* | 8/2007 | Askins | G01B 11/18 385/37 |
| 2009/0132183 A1* | 5/2009 | Hartog | G01D 5/35303 702/42 |
| 2011/0007996 A1* | 1/2011 | Huffman | G01M 5/0025 385/13 |
| 2011/0199608 A1* | 8/2011 | Nicolas | E21B 17/017 356/243.1 |
| 2012/0179390 A1* | 7/2012 | Kimmiau | E21B 47/0001 702/35 |
| 2015/0285626 A1 | 10/2015 | Yamauchi et al. | |
| 2015/0300909 A1* | 10/2015 | Giunta | G01M 5/0025 702/56 |
| 2015/0308909 A1* | 10/2015 | Carneal | G01M 5/0025 250/206 |
| 2018/0171778 A1* | 6/2018 | Hoehn | E21B 47/0006 |
| 2019/0033102 A1* | 1/2019 | Pionetti | E21B 41/0007 |
| 2019/0234726 A1* | 8/2019 | Gifford | G01B 11/161 |
| 2019/0242763 A1* | 8/2019 | Majdoub | E21B 17/012 |

* cited by examiner

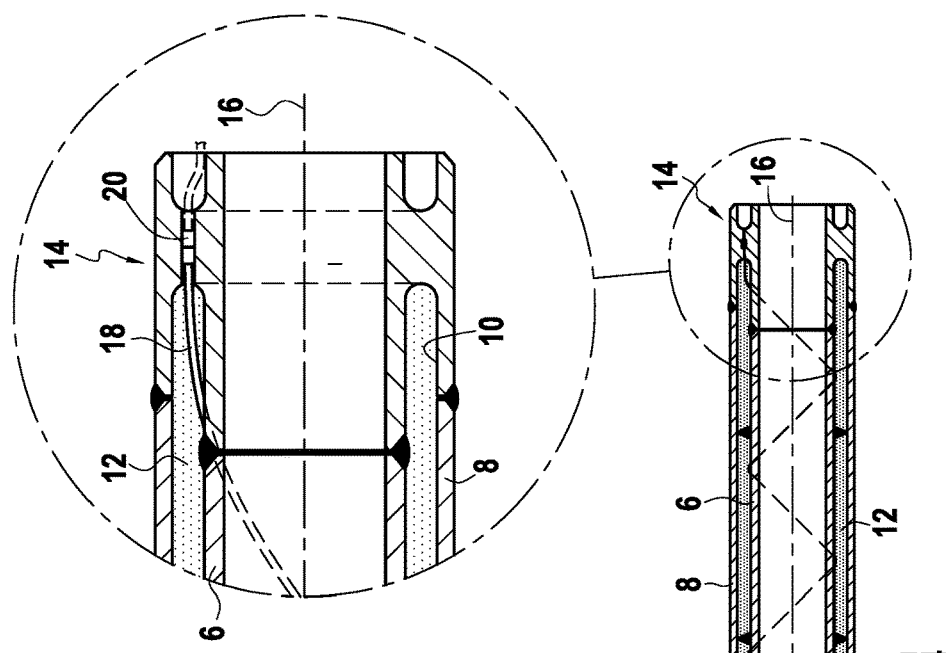
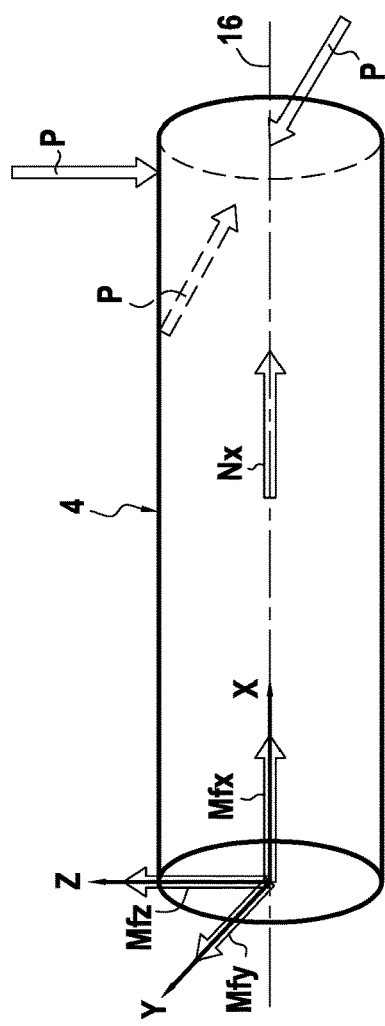
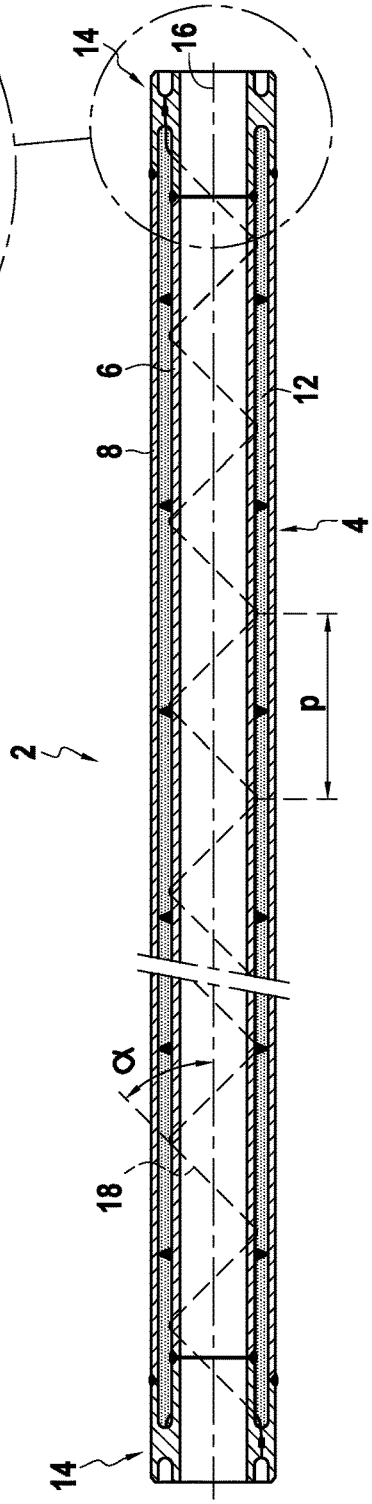
FIG.1
FIG.2

METHOD AND DEVICE FOR MONITORING THE MECHANICAL BEHAVIOUR OF A SUBSEA PIPE FOR TRANSPORTING PRESSURIZED FLUIDS

PRIORITY CLAIM

This is a U.S. national stage of application No. PCT/FR2017/050122, filed on Jan. 20, 2017. Priority is claimed on France Application No. FR1650829, filed Feb. 2, 2016.

BACKGROUND OF THE INVENTION

The present invention relates to the general field of undersea fluid transport pipes that rest on the sea bottom or that provide a bottom-to-surface connection for transporting hydrocarbons, e.g. oil and gas, from undersea production wells.

Undersea fluid transport pipes are commonly used in offshore hydrocarbon production. Thus, in an offshore production field, a plurality of wells are generally worked, which wells may be spaced apart from one another by several kilometers, or indeed tens of kilometers. The fluids coming from the various wells need to be collected by pipes that are laid on the sea bottom and transferred by bottom-to-surface connection pipes from an undersea pipe resting on the sea bottom to a surface installation that receives them, e.g. on board a ship or at a collection point situated onshore.

There exist various types of undersea pipes that are used for transporting fluids. The invention relates more particularly to coaxial pipes of the pipe in pipe (PIP) type, in which an inner steel tube transports the fluids and an outer steel tube coaxial with the internal tube, and also referred to as the "outer shell", is in contact with the surrounding medium, i.e. with the water.

In general, such coaxial pipes are assembled on land from unit lengths (referred to as double, triple, or quadruple "joints", with the term "quad-joints" being used herein for quadruple sections of tube), which unit lengths present a length lying in the range 10 meters (m) to 100 m, depending on the load-holding capacity of the laying system. Such quad-joints are then taken to sea on a laying ship.

During laying, the quad-joints are connected to one another on board the ship progressively as they are being laid at sea. This laying may be performed by using a J-lay tower positioned on the laying ship. With J-laying, the undersea pipe is typically lowered from the laying ship while it is practically vertical (at an angle in the range +30° to −10° relative to the vertical). J-laying is single-catenary laying in which the almost vertical angle of inclination of the pipe decreases progressively as it moves downwards until it takes on the slope of the sea bottom.

Given their specificity, undersea fluid transport pipes are designed to achieve a high level of thermal performance, and specific versions have been developed to be better adapted to great depths, i.e. to withstand pressure at the bottom of the sea. Specifically, since the pressure of water is substantially 0.1 megapascals (MPa), i.e. about 1 bar, for a depth of 10 m, the pressure that undersea pipes need to be able to withstand is then about 10 MPa, i.e. about 100 bar, for a depth of 1000 m, and about 30 MPa, i.e. about 300 bar, for a depth of 3000 m.

Furthermore, undersea pipes are subjected to high levels of mechanical stress, both while they are being laid on the bottom of the sea via a J-lay tower, which gives rise to high levels of deformation (in particular in bending) in each of the quad-joints of the pipe, and also during the production stage (internal thermal stresses and stresses due to external forces). Specifically, once the undersea pipe has been installed on the bottom of the sea and the network is in production, the inner tubes of the quad-joints of the pipe are subjected to the high pressure of the fluids they are transporting (which pressure can exceed 100 bar). Furthermore, it often happens that the sea bottom on which the pipe is resting moves, which gives rise to movements of the pipe, and thus to stresses in them.

However, the mechanical stresses to which undersea pipes are subjected, and more particularly the inner tubes of PIP pipes, and also the temperatures to which they are subjected (hydrocarbons coming from undersea production wells are at a temperature of about 70° C.), run the risk of leading to major damage or even breakage of the pipes.

OBJECT AND SUMMARY OF THE INVENTION

There thus exists a need to be able to monitor the mechanical behavior of an undersea pipe for transporting fluid, both while it is being laid and also during a stage of production.

In accordance with the invention, this need is satisfied by means of a method of monitoring the mechanical behavior of an undersea pipe for transporting fluid under pressure, the undersea pipe being made by assembling together a plurality of unit pipe elements arranged end to end, the method comprising:

a mechanical calibration step consisting in using at least one measurement cable having at least one optical fiber sensor using at least Brillouin backscattering and positioned along the entire length of the unit pipe elements to measure the deformations experienced by each unit pipe element while it is being subjected on land to various different mechanical stresses in predetermined directions and of predetermined magnitudes, and, on the basis of the deformation measurements, in establishing the mechanical signature of each unit pipe element; and a monitoring step consisting in using a measurement cable having at least one optical fiber sensor that makes use of Brillouin backscattering and that is helically positioned at a constant pitch on each unit pipe element, with the handedness of the helical pitch alternating for two adjacent unit pipe elements, to recover variations in the optical signal injected into said optical fiber sensors while the pipe is in service, and, on the basis of such variations in the optical signal and of the mechanical signature of each unit pipe element, to determine the stresses experienced by each unit pipe element.

Correspondingly, the invention provides a device for monitoring the mechanical behavior of an undersea pipe for transporting fluid under pressure, the undersea pipe being made by assembling together a plurality of unit pipe elements end to end, the device comprising, for each unit pipe element, at least one measurement cable having at least one optical fiber sensor using Brillouin backscattering and positioned as a helix of constant pitch on said unit pipe element, two adjacent unit pipe elements being provided with measurement cables in which the optical fiber sensors are helically positioned with helical pitches of alternating handedness.

The monitoring method of the invention is remarkable in particular in that it uses mechanical signatures that are specific to each unit element (or quad-joint) of the undersea pipe in order to monitor the mechanical stresses experienced by the pipe. Prior to being laid, during the calibration step, each unit pipe element is tested on land (in a laboratory or a factory) and it is subjected to various different mechanical stresses of predetermined directions and magnitudes. The deformations occurring in the unit pipe element are measured by the optical fiber sensors.

During the monitoring step proper, measurements are taken by optical fiber sensors that are helically positioned around the quad-joint, with the handedness of the helical pitch for two adjacent quad-joints alternating. This arrangement of the optical fiber sensors is particularly advantageous (in particular since it requires a small number of optical fiber sensors in order to monitor multiple mechanical stresses) and it is made possible by assuming that certain mechanical stresses experienced by the quad-joints of the undersea pipe are three-dimensionally uniform relative to the pitch of the helix formed by the optical fiber sensor (the pitch of the helix is very small compared with three-dimensional variation of the stresses). The optical fiber sensors as positioned in this way are used, on the basis of mechanical signatures of the unit pipe elements, to determine the deformation that is experienced in service by each of the unit pipe elements. On the basis of knowledge about the mechanical behavior of each unit pipe element, it is then possible to reconstruct the overall mechanical behavior of the undersea pipe, both while it is being laid and also during a production stage.

The monitoring method and a device of the invention also make it possible to have accurate knowledge about the state of the undersea pipe at the connections between the various unit pipe elements, which is not possible with a single measurement line over the entire length of the pipe.

The method of the invention is also most particularly suitable for the J-laying technique for laying an undersea pipe, during which no permanent deformation is imparted to the pipe (the pipe remains below 90% of its elastic limit). Once it has been laid, the pipe continues to remain in a linear domain (below 66% of its elastic limit), which means that the disturbing phenomena experienced by the pipe (such as elastic deformations) can be linearized.

The mechanical signature of a unit pipe element may comprise a stiffness matrix of values corresponding to the values of deformation experienced by the unit pipe element while it was being subjected on land to various different mechanical stresses. Under such circumstances, determining the deformations experienced by each unit pipe element comprises inverting the stiffness matrix associated with the mechanical signature of each unit pipe element. Thus, the stiffness matrix represents the mechanical identity specific to each unit pipe element.

Preferably, the helix formed by the optical fiber sensor of each unit pipe element forms an angle having an absolute value of 45° with a longitudinal axis of the undersea pipe.

The mechanical stresses of predetermined directions and amplitudes applied on land to each unit pipe element may comprise one or more of the following stresses: twisting stress; traction/compression stress; bending stress; and pressure stress.

The optical fiber sensor measurement cables may be positioned on the unit pipe elements in such a manner as to extend substantially parallel to a longitudinal axis of said pipe.

Preferably, the measurement cable optical fiber sensors that use Brillouin backscattering are monomode fibers.

In an application to monitoring a PIP pipe, each unit pipe element may comprise an inner tube mounted coaxially inside an outer tube, the optical fiber sensor measurement cables being positioned on the inner tube of said unit pipe element.

The method may also include:
an acoustic calibration step consisting in using the measurement cable having the optical fiber sensor that uses at least Brillouin backscattering and that is positioned along the entire length of the unit pipe elements to measure the frequency variations of each unit pipe element while it is being subjected on land to various different acoustic stresses, and, on the basis of these noise variations, to establish an acoustic signature for each unit pipe element; and
a step of monitoring noise variations inside the undersea pipe, consisting in recovering the frequency variations of the optical signal injected into the optical fiber sensors while the pipe is in service, and, on the basis of the frequency variations and of the acoustic and vibratory signature of each unit pipe elements, in determining the noise variations inside each unit pipe element.

Thus, the optical fiber sensors that use Brillouin backscattering can not only provide information about the mechanical stresses experienced by the pipe, but can also provide information about variations in surrounding sources of vibration. Among such surrounding sources of vibration, it is possible in particular to distinguish between those generated by the unit pipe element on which the optical fiber sensors are positioned, and those generated by the outside environment (specifically the sea bottom and anything connected thereto).

BRIEF DESCRIPTION OF THE DRAWINGS

Other characteristics and advantages of the present invention appear from the following description made with reference to the accompanying drawings, which show implementations having no limiting character. In the figures:

FIG. 1 is a diagrammatic view of an undersea pipe fitted with a monitoring device of the invention;

FIG. 2 is a diagrammatic view of an undersea pipe quad-joint to which various different mechanical stresses are applied in order to establish its mechanical signature.

DETAILED DESCRIPTION OF THE INVENTION

Figure 3:
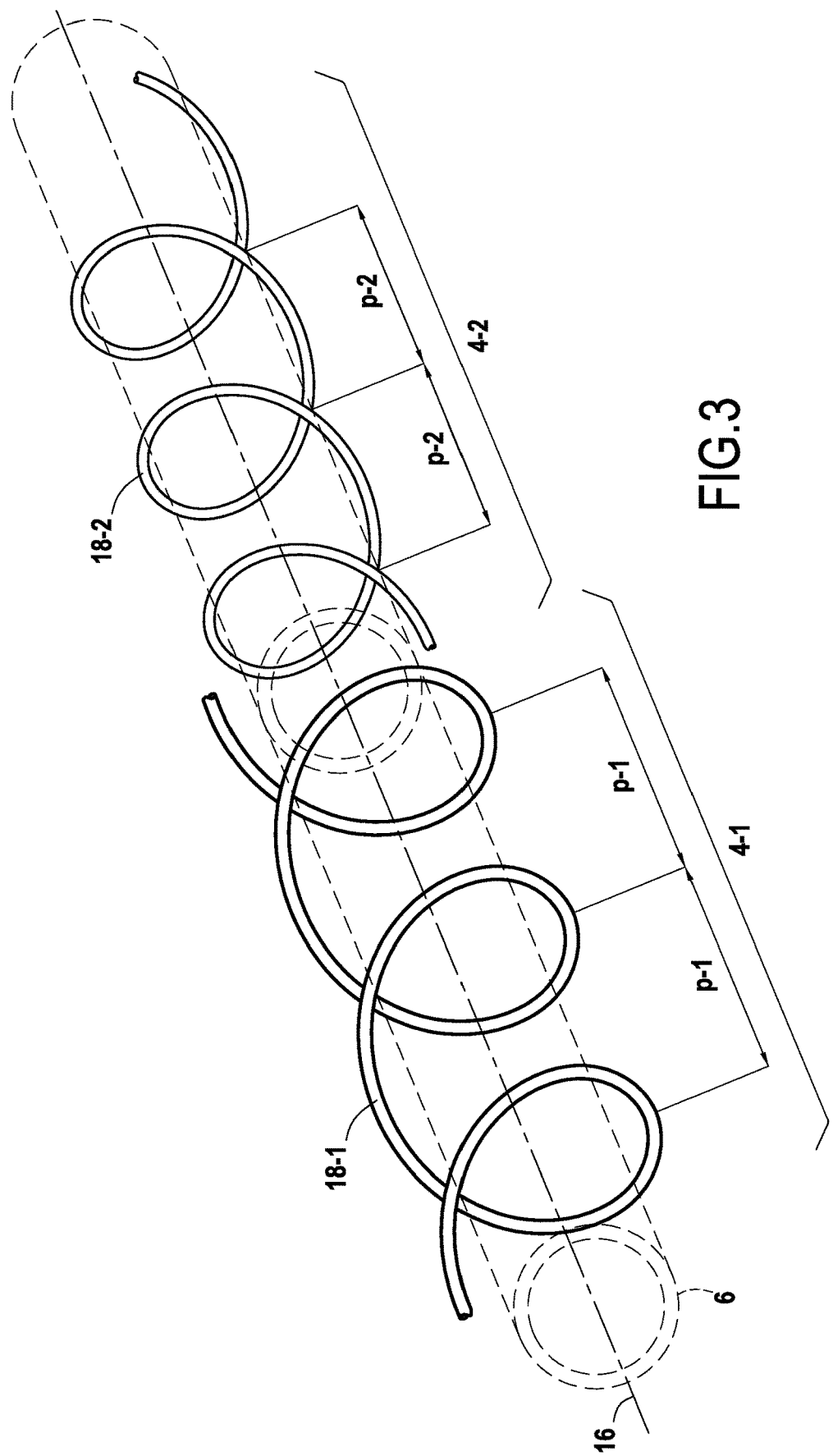
FIG. 3 is a perspective view showing the arrangement of the optical fiber sensors of the FIG. 1 monitoring device on two adjacent quad-joints of the undersea pipe.

The invention applies to any undersea pipe resting on the sea bottom and serving to transport specifically oil and gas between undersea hydrocarbon production wells and a surface installation, such as the undersea pipe 2 shown in FIGS. 1 and 2.

The undersea pipe 2 shown in the figures is typically assembled on land as a plurality of pipe sections 4 each having a unit length of about 10 m to 100 m, depending on the load-holding capacity of the laying system. The term "joints" is also used, in particular "double joints" for two unit pipe elements assembled together, "triple joints" for three unit pipe elements assembled together, "quadruple joints" for four unit pipe elements assembled together, etc. In the description below, the term "quad-joint" is used generically to designate any unit pipe element 4. During laying, the quad-joints 4 are connected to one another on board the ship progressively as they are being laid at sea.

Furthermore, the undersea pipe 2 is a coaxial pipe of the pipe in pipe (PIP) type, i.e. each quad-joint (or unit pipe element) 4 comprises an inner steel tube 6 for transporting hydrocarbons from production wells, and an outer steel tube 8 that is coaxial about the inner tube and that is referred to as the "outer shell", which outer tube is in direct contact with the surrounding water.

In known manner, the annular space 10 formed between the inner tube 6 and the outer tube 8 of each quad-joint 4 may be filled with an insulating material 12 (or may have gas evacuated therefrom) so as to form a thermally insulating layer that limits the loss of heat to the surrounding medium. At each of its ends, the inner tube 6 may be secured to the outer tube 8 via junction parts 14 that close the annular space 10.

According to the invention, provision is made to monitor the mechanical behavior of such an undersea pipe 2, i.e. to monitor the mechanical stresses it experiences while it is being laid on the sea bottom and during a stage in which the network is in production (i.e. while it is in service).

The monitoring method of the invention provides for two main steps: a "calibration" step during which the mechanical signature of each quad-joint of the undersea pipe is obtained; and a monitoring step proper during which the stresses experienced by the undersea pipe are determined on the basis of the mechanical signature of each quad-joint and on the basis of measurements taken by the optical fiber sensors during laying of the undersea pipe and/or during the stage of production from the network.

Calibration Step

This mechanical calibration step consists in testing each quad-joint of the undersea pipe on land in order to obtain its mechanical signature. This step is described in detail in the French patent application filed on Feb. 2, 2016 by the Applicant and entitled "Procédé de surveillance du comportement thermomécanique d'une conduite sous-marine de transport de fluides sous pression" [A method of monitoring the thermomechanical behavior of an undersea pipe for transporting fluid under pressure].

For this purpose, each quad-joint is subjected in a laboratory or a factory to a series of various different mechanical stresses in predetermined directions and of predetermined magnitudes, and the deformations experienced by the quad-joint during the testing are measured by optical fiber sensors.

More precisely, the quad-joint 4 is fitted with measurement cables 16 provided with optical fiber sensors, each optical fiber sensor being for measuring a single corresponding deformation parameter of the quad-joint.

The measurement cables may be positioned on the inner tube 6 of the quad-joint 4 (by way of example they are adhesively bonded on its outer surface) and they extend longitudinally between the two ends of the quad-joint as described in the French patent application filed on Feb. 2, 2016 by the Applicant and entitled "Procédé de surveillance du comportement thermomécanique d'une conduite sous-marine de transport de fluides sous pression" [A method of monitoring the thermomechanical behavior of an undersea pipe for transporting fluid under pressure].

The optical fibers in the measurement cables are monomode fibers using Brillouin backscattering for the sensors that are to measure the mechanical stresses experienced by the quad-joint.

In the example described below, the mechanical stresses applied to the quad-joints of the undersea pipe are the following: twisting stress (about the longitudinal axis 16 of the quad-joints); bending stress (in a YZ plane transverse to the quad-joints); traction/compression stress (along the direction of the longitudinal axis of the quad-joints); and pressure stress internal to the quad-joints.

All of the stresses are defined by respective application directions and magnitudes that are predetermined. Thus, as shown in FIG. 2, the twisting stress applied to the quad-joint 4 consists in creating a twisting moment (represented by Mtx in FIG. 3) having as its application direction the X axis of an (O, X, Y, Z) rectangular reference frame specific to the quad-joint. Likewise, the bending stress applied to the quad-joint consists in creating two bending moments (represented by Mfy and Mfz in FIG. 3) having respective application directions along the Y and Z axes of the (O, X, Y, Z) reference frame. The traction/compression stress applied to the quad-joint (represented in FIG. 3 by Nx) has an application direction along the X axis. Finally, the pressure stress is represented by P in FIG. 3 and its application direction is radial relative to the pipe.

During the test, the various above-described stresses are applied to each quad-joint, and an optoelectronic measurement apparatus of the optical time domain reflectometer (OTDR) type, as is commonly used for characterizing optical fibers, serves to measure the deformation values, written $\varepsilon i$, to which the quad-joint is subjected.

Thus, by means of the measurements $\varepsilon 1$ to $\varepsilon 5$ obtained by the optical fiber sensors, it is possible, for elastic materials, to obtain the stiffness matrix Q that satisfies following equation (1):

$$\begin{pmatrix} \varepsilon 1 \\ \varepsilon 2 \\ \varepsilon 3 \\ \varepsilon 4 \\ \varepsilon 5 \end{pmatrix} = \underbrace{\begin{pmatrix} a11 & a12 & a13 & a14 & a15 \\ a21 & a22 & a23 & a24 & a25 \\ a31 & a32 & a33 & a34 & a35 \\ a41 & a42 & a43 & a44 & a45 \\ a51 & a52 & a53 & a54 & a55 \end{pmatrix}}_{\Omega} \times \begin{pmatrix} Mtx \\ Mfy \\ Mfz \\ Nx \\ P \end{pmatrix} \quad (1)$$

From the deformation values $\varepsilon 1$ to $\varepsilon 5$ measured by the optical fiber sensors and from the intensity values Mtx, Mfy, Mfz, Nx of the various different mechanical stresses applied to the quad-joint during the calibration step, it is then possible to determine all of the parameters a11, a12, . . . , a55 of the stiffness matrix Q specific to the quad-joint. Since the optical fibers run along different paths on the surface of the inner tube of the quad-joint, this matrix is invertible. During the mechanical calibration tests, the stresses must be kept within the elastic domain of the materials constituting the quad-joint.

This stiffness matrix Q constitutes a mechanical signature that is specific to each quad-joint for making up the undersea pipe. Specifically, the parameters and the tolerances of the component materials (concentricity and thicknesses of the tubes, stiffnesses of the insulation in the annulus and of the spacers, characteristics of welded joints, etc.) are different for each quad-joint, such that the stiffness matrix varies from one quad-joint to another.

The mechanical signatures are in the form of digital files that are stored in a memory of a computer system on board the laying ship and/or the surface installation, for subsequent use in monitoring the mechanical behavior of the undersea pipe during the monitoring step proper, as described below.

Acoustic Calibration Step

This acoustic calibration step takes place under the same operating conditions as the mechanical calibration stage. Each quad-joint fitted with its optical fiber sensor using Brillouin backscattering is subjected to various different acoustic and vibratory stresses on land (i.e. in a laboratory or in a factory).

These acoustic and vibratory stresses comprise emitting noises (in a working frequency spectrum typically ranging from 0 to 50 kHz) in various different configurations:

emitting noises inside the air-filled quad-joint via a bar connecting together the two ends of the quad-joint, emitting noises into the water-filled inside of the quad-joint via a bar connecting together its two ends, and emitting noises outside the quad-joint previously filled with air and then with water using a protocol that is calibrated for each quad-joint (e.g. by means of a system emitting a calibrated sound vibration or by means of vibrating studs setting the entire quad-joint into vibration).

Each time noise or vibration is emitted during this calibration step, the optical time domain reflectometer (OTDR) that is used for characterizing the optical fiber sensors also serves to measure the frequency variations of the quad-joint. By way of example, these measurements are in the form of a matrix and they constitute the acoustic and vibratory signature for each quad-joint (i.e. its base reference).

As for the mechanical signatures, the acoustic and vibratory signatures of all of the quad-joints are in the form of digital files that are stored in a memory of the computer system on board the laying ship and/or the surface installation, for subsequent use in monitoring the behavior of the undersea pipe during the monitoring step proper, as described below.

Monitoring Step

As shown in FIG. 3, during this step, the various different quad-joints 4 that are to form of the undersea pipe 2 are each fitted with a respective measurement cable 18 having at least one optical fiber sensor using Brillouin backscattering, the cable being positioned helically around the inner pipe 6 of the quad-joint 4 (e.g. being adhesively bonded to its outer surface).

More precisely, the measurement cable 18 of a quad-joint 4 of the undersea pipe forms a helix of pitch p that is constant and that forms an angle α with the longitudinal axis 16 of the undersea pipe, which angle α is preferably equal to 45°.

Furthermore, for two adjacent quad-joints 4-1, 4-2 of the undersea pipe (see FIG. 3), the helices formed by their respective measurement cables 18-1, 18-2 have respective pitches p-1, p-2 that are identical in absolute value but that are oppositely handed. In other words, the angles α formed by the helices are opposite (e.g. one of these angles is +45° while the other angle is −45° relative to the longitudinal axis 16 of the undersea pipe).

This alternation in the handedness of the helical pitches formed by the measurement cables of adjacent quad-joints is to be found over the entire length of the undersea pipe. It is based on the assumption that at the scale of two consecutive quad-joints, the mechanical stresses Nx, Mfz, Mfy, and P are uniform in three dimensions. Thus, with only one optical fiber sensor, it is possible to calculate the values Mtx, Mfy, Mfz, Nx, and P of the deformations experienced by each quad-joint.

Still during the monitoring step, the various different quad-joints of the undersea pipe as fitted in this way with that measurement cables are connected to one another on board the ship progressively while they are being laid at sea, as is known to the person skilled in the art. This connection implies in particular that the measurement cables 18 are connected to one another, e.g. by causing them to pass through holes 20 formed in the junction parts 14 (see the detail of FIG. 1).

Furthermore, during laying, the quad-joints 4 are indexed in rotation relative to one another, i.e. the (O, X, Y, Z) reference frame specific to each quad-joint is identified both in rotation and in translation in a more general reference frame by means of a geographical information system (GIS).

During laying, and throughout the stage in which the network is in production, the measurements taken by optical time domain reflectometry (OTDR) of the optical fiber sensors using Brillouin backscattering are analyzed in order to determine the behavior of the undersea pipe faced with the deformation to which it might be subjected. This step of recovering and analyzing measurements taken by reflectometry may be performed by the computer system provided with suitable software means and present on board the laying ship and/or the surface installation.

Specifically, by starting from the above-described equation (1), and by inverting the stiffness matrix Q specific to each quad-joint making up the undersea pipe, it is possible by means of calculation software in the computer system to calculate the values Mtx, Mfy, Mfz, Nx, and P of the deformations experienced by each quad-joint by applying equation (3) below:

$$\begin{pmatrix} Mtx \\ Mfy \\ Mfz \\ Nx \\ P \end{pmatrix} = \begin{pmatrix} a11 & a12 & a13 & a14 & a15 \\ a21 & a22 & a23 & a24 & a25 \\ a31 & a32 & a33 & a34 & a35 \\ a41 & a42 & a43 & a44 & a45 \\ a51 & a52 & a53 & a54 & a55 \end{pmatrix}^{-1} \times \begin{pmatrix} \varepsilon1 \\ \varepsilon2 \\ \varepsilon3 \\ \varepsilon4 \\ \varepsilon5 \end{pmatrix} \quad (3)$$

As a result, it is possible at all times during the laying of the undersea pipe and throughout the stage of production from the network to have knowledge of the mechanical deformations experienced by each quad-joint making up the undersea pipe. In particular, it is thus possible to identify accurately the location at which the undersea pipe is subjected to a large amount of deformation that might lead to major damage, or even to breakage of the pipe, or to a plug becoming formed inside the pipe that could also lead to breakage of the pipe. Locating this position is made possible by the calibration stages that make it possible to know accurately the lengths and the locations of the fibers deployed in the undersea pipe.

Monitoring of noise variations inside the undersea pipe is performed by comparing the measurements taken throughout the stage of production in the network by optical time domain reflectometry (OTDR) of the optical fiber sensors using Brillouin backscattering with the acoustic and vibratory signatures established for each quad-joint during the acoustic calibration step.

This step of recovering and analyzing measurements taken by optical time domain reflectometry may be performed by the computer system provided with suitable software means and present on board the laying ship and/or the surface installation.

Furthermore, it is also possible to monitor the temperature of the undersea pipe throughout the stage of production from the network on the basis of thermal signatures established for each quad-joint as described in detail in the French patent application number 16 50826 filed on Feb. 2, 2016 by the Applicant and entitled "Procédé de surveillance du comportement thermomécanique d'une conduite sous-marine de transport de fluides sous pression" [A method of monitoring the thermomechanical behavior of an undersea pipe for transporting fluid under pressure].

The invention claimed is:
1. A method of monitoring the mechanical behavior of an undersea pipe for transporting fluid under pressure, the undersea pipe being made by assembling together a plurality of unit pipe elements arranged end to end, the method comprising:

a mechanical calibration step comprising using at least one measurement cable having at least one optical fiber sensor using at least Brillouin backscattering and positioned along the entire length of the unit pipe elements to measure deformations experienced by each unit pipe element while it is being subjected on land to various different mechanical stresses in predetermined directions and of predetermined magnitudes, and, on the basis of the deformation measurements, in establishing a mechanical signature of each unit pipe element; and a monitoring step comprising consisting in using a measurement cable having at least one optical fiber sensor that makes use of Brillouin backscattering and that is helically positioned at a constant pitch (p) on each unit pipe element, with the handedness of the helical pitch alternating for two adjacent unit pipe elements, to recover variations in an optical signal injected into said optical fiber sensors while the pipe is in service, and, on the basis of such variations in the optical signal and of the mechanical signature of each unit pipe element, to determine stresses experienced by each unit pipe element.

2. The method according to claim 1, wherein the mechanical signature of a unit pipe element comprises a stiffness matrix having values that correspond to the values of deformation that were experienced by the unit pipe element while it was being subjected on land to the various different mechanical stresses, and the deformation being experienced by each unit pipe element is determined by inverting the stiffness matrix associated with the mechanical signature of each unit pipe element.

3. The method according to claim 1, wherein the mechanical stresses of predetermined directions and amplitudes applied on land to each unit pipe element comprise one or more of the following stresses: twisting stress; traction/compression stress; bending stress; and pressure stress.

4. The method according to claim 1, wherein the measurement cable optical fiber sensors that use Brillouin backscattering are monomode fibers.

5. The method according to claim 1, wherein each unit pipe element comprises an inner tube mounted coaxially inside an outer tube, the optical fiber sensor measurement cables being positioned on the inner tube of said unit pipe element.

6. The method according to claim 1, further comprising:
an acoustic calibration step comprising using the measurement cable having the optical fiber sensor that uses at least Brillouin backscattering and that is positioned along the entire length of the unit pipe elements to measure frequency variations of each unit pipe element while it is being subjected on land to various different acoustic and vibratory stresses, and, on the basis of noise variations, to establish an acoustic signature for each unit pipe element; and a step of monitoring noise variations inside the undersea pipe, comprising recovering frequency variations of the optical signal injected into the optical fiber sensors while the pipe is in service, and, on the basis of the frequency variations and of the acoustic and a vibratory signature of each unit pipe elements, in determining the noise variations inside each unit pipe element.

7. The method according to claim 1, wherein the helix formed by the optical fiber sensor of each unit pipe element forms an angle (a) having an absolute value of 45° with a longitudinal axis of the undersea pipe.

8. The method according to claim 7, wherein the mechanical signature of a unit pipe element comprises a stiffness matrix having values that correspond to the values of deformation that were experienced by the unit pipe element while it was being subjected on land to the various different mechanical stresses, and the deformation being experienced by each unit pipe element is determined by inverting the stiffness matrix associated with the mechanical signature of each unit pipe element.

9. The method according to claim 2, wherein the mechanical stresses of predetermined directions and amplitudes applied on land to each unit pipe element comprise one or more of the following stresses: twisting stress; traction/compression stress; bending stress; and pressure stress.

10. The method according to claim 3, wherein the measurement cable optical fiber sensors that use Brillouin backscattering are monomode fibers.

11. The method according to claim 4, wherein each unit pipe element comprises an inner tube mounted coaxially inside an outer tube, the optical fiber sensor measurement cables being positioned on the inner tube of said unit pipe element.

12. The method according to claim 5, further comprising:
an acoustic calibration step comprising using the measurement cable having the optical fiber sensor that uses at least Brillouin backscattering and that is positioned along the entire length of the unit pipe elements to measure frequency variations of each unit pipe element while it is being subjected on land to various different acoustic and vibratory stresses, and, on the basis of noise variations, to establish an acoustic signature for each unit pipe element; and a step of monitoring noise variations inside the undersea pipe, comprising recovering frequency variations of the optical signal injected into the optical fiber sensors while the pipe is in service, and, on the basis of the frequency variations and of the acoustic and a vibratory signature of each unit pipe elements, in determining the noise variations inside each unit pipe element.

13. A device for monitoring the mechanical behavior of an undersea pipe for transporting fluid under pressure, the undersea pipe being made by assembling together a plurality of unit pipe elements end to end, the device comprising, for each unit pipe element, at least one measurement cable having at least one optical fiber sensor using Brillouin backscattering and positioned as a helix of constant pitch on said unit pipe element, two adjacent unit pipe elements being provided with measurement cables in which the optical fiber sensors are helically positioned with helical pitches of alternating handedness.

14. The device for monitoring the mechanical behavior of the undersea according to claim 13, wherein the optical fibers of the two adjacent pipeline segments are nonoverlapping.

* * * * *

UNITED STATES PATENT AND TRADEMARK OFFICE
CERTIFICATE OF CORRECTION

PATENT NO. : 10,768,023 B2  
APPLICATION NO. : 16/074998  
DATED : September 8, 2020  
INVENTOR(S) : Francois-Regis Pionetti et al.

Page 1 of 1

It is certified that error appears in the above-identified patent and that said Letters Patent is hereby corrected as shown below:

On the Title Page

(73) Assignees should read:     SAIPEM S.A.   MONTIGNY LE BRETONNEUX, FRANCE  
                                            CEMENTYS   PARIS, FRANCE Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*